United States Patent
Ye et al.

(10) Patent No.: US 12,498,179 B2
(45) Date of Patent: Dec. 16, 2025

(54) THERMOELECTRIC COOLING DEVICE AND COLD WATER GENERATOR HAVING SAME

(71) Applicant: COWAY Co., Ltd., Gongju-si (KR)

(72) Inventors: Byung-Hyo Ye, Seoul (KR); Jung-Hwan Lee, Seoul (KR); Jae-Man Kim, Seoul (KR); Min-Chul Yong, Seoul (KR); Chung-Lae Kim, Seoul (KR); Jin-Hyeok Jang, Seoul (KR); Young-Kwang Choi, Seoul (KR); Jin-Woo Choi, Seoul (KR); Seong-Min Park, Seoul (KR); Young-Jae Lee, Seoul (KR); Sang-Jin Youn, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 77 days.

(21) Appl. No.: 18/001,302

(22) PCT Filed: Jun. 10, 2021

(86) PCT No.: PCT/KR2021/007268
§ 371 (c)(1),
(2) Date: Dec. 9, 2022

(87) PCT Pub. No.: WO2021/251769
PCT Pub. Date: Dec. 16, 2021

(65) Prior Publication Data
US 2023/0251043 A1    Aug. 10, 2023

(30) Foreign Application Priority Data

Jun. 11, 2020 (KR) .................. 10-2020-0071062

(51) Int. Cl.
*F28D 15/02* (2006.01)
*F25B 21/02* (2006.01)
(Continued)

(52) U.S. Cl.
CPC .......... *F28D 15/0275* (2013.01); *F25B 21/02* (2013.01); *F25D 15/00* (2013.01);
(Continued)

(58) Field of Classification Search
CPC ............... F28D 15/0275; F28D 15/00; F28D 2021/0029; F25B 21/02; F25D 23/003; F25D 31/002; F28F 21/08; G06F 1/20
(Continued)

(56) References Cited

U.S. PATENT DOCUMENTS 6,119,464 A * 9/2000 Nakayama .............. F25D 21/02
                                                     62/139
9,292,058 B2 * 3/2016 Demange ........... H05K 7/20218
(Continued)

FOREIGN PATENT DOCUMENTS

JP    2013-542604 A    11/2013
JP    2014-159946 A    9/2014
(Continued)

OTHER PUBLICATIONS

International Search Report mailed on Sep. 23, 2021 in PCT/KR2021/007268 filed on Jun. 10, 2021, 2 pages.

*Primary Examiner* — Joel M Attey
(74) *Attorney, Agent, or Firm* — Oblon, McClelland, Maier & Neustadt, L.L.P.

(57) ABSTRACT

Provided is a thermoelectric cooling device comprising: a thermoelectric module; a heat sink having a body, which has on one side a contact surface coming into contact with a heating side of the thermoelectric module, and a plurality of heat dissipation fins, and emitting the heat transferred from the heating side of the thermoelectric module; a heat pipe coupled to a mounting groove which is formed on the contact surface of the heat sink, and for transferring heat by means of a working fluid stored therein; and a cooling fan
(Continued)

for forming the airflow to the heat sink, wherein the heat pipe comprises a plurality of corner-extension heat pipes extending to a corner area of the heat sink from the central part of the heat sink on which the thermoelectric module is installed, and the shape of the mounting groove corresponds to the shape of the corner-extension heat pipes.

4 Claims, 10 Drawing Sheets

(51) Int. Cl.
*F25D 15/00* (2006.01)
*F25D 23/00* (2006.01)
*F25D 31/00* (2006.01)
*F28F 21/08* (2006.01)
*G06F 1/20* (2006.01)
*F28D 21/00* (2006.01)

(52) U.S. Cl.
CPC ......... *F25D 23/003* (2013.01); *F25D 31/002* (2013.01); *F28F 21/08* (2013.01); *G06F 1/20* (2013.01); *F28D 2021/0029* (2013.01)

(58) Field of Classification Search
USPC .................................... 165/104.21, 104.33
See application file for complete search history.

(56) References Cited

U.S. PATENT DOCUMENTS

| | | | |
|---|---|---|---|
| 2012/0222840 A1* | 9/2012 | Huang | .................... F28F 9/013 29/890.032 |
| 2013/0182389 A1 | 7/2013 | Demange et al. | |
| 2014/0233174 A1 | 8/2014 | Demange | |
| 2020/0080755 A1 | 3/2020 | Jung et al. | |

FOREIGN PATENT DOCUMENTS

| KR | 10-2002-0021845 A | 3/2002 |
| KR | 10-2014-0055418 A | 5/2014 |
| KR | 10-2018-0117526 A | 10/2018 |
| KR | 10-2018-0119251 A | 11/2018 |

\* cited by examiner

THERMOELECTRIC COOLING DEVICE AND COLD WATER GENERATOR HAVING SAME

TECHNICAL FIELD

The present disclosure relates to a thermoelectric cooling device and a cold water generator having the same, and more particularly, to a thermoelectric cooling device having excellent heat dissipation and cooling efficiency and a cold water generator including the same.

BACKGROUND ART

A cooling device used for cooling an object may use a general cooling cycle including a compressor, a condenser, and an evaporator, but recently, a cooling device using a thermoelectric module has also been widely used for small-scale cooling.

Such a thermoelectric cooling device may also be used to generate cold water in a water purifier or a water cooler.

A general thermoelectric cooling device may dispose a cooling object on the cooling side of the thermoelectric module using a phenomenon in which heat absorption and heat generation occur simultaneously on both sides of a thermoelectric module by the Peltier effect, and a heat sink (a heat dissipation member) for heat dissipation may be installed on the heating side. A plurality of heat dissipation fins may be formed in the heat sink to increase a contact area with air to promote heat dissipation. Also, a cooling fan may be installed in the heat sink and may promote heat dissipation of the heat sink through blowing to the heat sink.

In this case, the heat sink may be designed to have a larger area than that of the thermoelectric module for smooth heat dissipation. The heat sink may be formed of a metal material having excellent heat conduction (e.g., stainless steel), but the temperature of the central part of the heat sink in contact with the heat generating side of the thermoelectric module may be extremely high and the temperature of the outer part of the heat sink may be relatively low such that there has been a limitation in heat dissipation through the entire sink area.

To address the issue above, a heat dissipation structure using a heat pipe has been suggested in Patent Publication No. 2018-0119251 or Patent Publication No. 2014-0055418 filed by the present applicant. The heat pipe may include an evaporation unit and a condensing unit, and heat may be transferred using latent heat of working fluid.

However, in the case of the prior art, the heat dissipation efficiency may improve by using a heat pipe, but there is a problem in that the heat pipe installation structure may be extremely complicated and it may not be easily to manufacture the structure. Moreover, in the prior art, it may be necessary to change the structure of a heat sink provided in a general thermoelectric cooling device to a considerable extent.

(Reference 1) KR2018-0119251 A
(Reference 2) KR2014-0055418 A

SUMMARY OF INVENTION

Technical Problem

The present disclosure has been devised to address at least a portion of the problems of the prior art as described above, and aims to provide a thermoelectric cooling device which may improve heat dissipation efficiency of a heat sink through a heat pipe to improve cooling efficiency through a thermoelectric module, and a cold water generator including the same.

Another aspect of the present disclosure is to provide a thermoelectric cooling device which may provide sufficient heat dissipation even through a periphery including a corner area of a heat sink and a cold water generator including the same.

Another aspect of the present disclosure is to provide a thermoelectric cooling device in which a combined structure of a heat pipe and a heat sink is simplified and a cold water generator including the same.

Solution to Problem

As an aspect of the present disclosure, the present disclosure provides a thermoelectric cooling device including a thermoelectric module performing cooling by applying electricity; a heat sink having a body having a contact surface in contact with a heat generating side on one side, and a plurality of heat dissipation fins formed on the other side of the body, and emitting heat transferred from the heat generating side of the thermoelectric module; a heat pipe coupled to a mounting groove formed on the contact surface of the heat sink and performing heat transfer through a working fluid accommodated therein; and a cooling fan forming an air flow to the heat sink, wherein the heat pipe includes a plurality of corner-extension heat pipes having a shape extending from a central part of the heat sink in which the thermoelectric module is installed to a corner area of the heat sink, and wherein the mounting groove has a shape corresponding to a shape of the corner-extension heat pipe.

Each of the corner-extension heat pipes may extend from both sides of the central part such that respective ends of each of the corner-extension heat pipes may reach two corner areas of the heat sink.

The heat sink may be formed in a quadrangular shape, and the heat pipe may include at least two corner-extension heat pipes such that an end of the corner-extension heat pipe may be disposed in four corner areas of the heat sink.

The corner area may correspond to four outermost areas when the contact surface of the heat sink is divided horizontally and vertically into four equal parts on a plane.

The heat pipe further may include a central heat pipe disposed between the two corner-extension heat pipes.

A width of the thermoelectric module may have a value greater than a central distance between the two corner-extension heat pipes.

In the heat pipe, a part exposed externally of the heat sink while being coupled to the mounting groove may have the same level as a level of the contact surface.

In the heat pipe, a central part corresponding to a central part of the heat sink may be disposed in a direction perpendicular to a direction of gravity.

As another aspect of the present disclosure, the present disclosure provides a cold water generator including a thermoelectric cooling device described above; and a tank body having a space for accommodating water therein, and cooling the water accommodated therein by a cooling side of the thermoelectric module.

The tank body may include a first body formed of synthetic resin and a second body formed of metal, and the cooling side of the thermoelectric module may be configured to absorb heat from the second body.

Advantageous Effects of Invention

According to an aspect of the present disclosure, heat from a central part of a heat sink in which a thermoelectric module is installed may move to a corner area of the heat sink through a heat pipe, and heat transferred to the corner area of the heat sink may be discharged such that the effect in which sufficient heat dissipation may be performed in a central part of the heat sink and also in the periphery including the corner area may be obtained. Accordingly, heat dissipation efficiency of the heat sink may improve, and also the temperature of a heat generating side of the thermoelectric module may be lowered, thereby improving cooling efficiency through a cooling side of the thermoelectric module.

Also, according to an embodiment of the present disclosure, by forming a mounting groove in the heat sink and installing a heat pipe in the mounting groove, a coupling structure between a heat pipe and a heat sink may be simplified and it may be easy to manufacture the structure.

DESCRIPTIONS OF REFERENCE NUMERALS

100 . . . Cold Water Generator 110 . . . Tank Body
120 . . . First Body 121 . . . Inlet
122 . . . Outlet 125 . . . Cross-Plate
130 . . . Second Body 132 . . . Fastening Hole
200 . . . Thermoelectric Cooling Device 210 . . . Thermoelectric Module
220 . . . Heatsink Assembly 230 . . . Heatsink
231 . . . Body 232 . . . Fastening Hole
233 . . . Heat Dissipation Fin 234 . . . Contact Surface
235 . . . Corner-Extension Mounting Groove 237 . . . Central Mounting Groove
240 . . . Heat Pipe 241 . . . Corner-Extension Heat Pipe
242 . . . Central Heat Pipe 250 . . . Cooling Fan
260 . . . Cooling Block 262 . . . Fastening Hole
A1, A2, A3, A4 . . . Corner Area D . . . Spacing Between Heat Pipes
He . . . Heat Pipe End W . . . Thermoelectric Module Width

BEST MODE FOR INVENTION

Hereinafter, preferred embodiments of the present disclosure will be described with reference to the accompanying drawings. However, the embodiment of the present disclosure may be modified in various other forms, and the scope of the present disclosure is not limited to the embodiments described below. Also, the embodiments of the present disclosure are provided to more completely explain the present disclosure to a person skilled in the art. The shapes and sizes of elements in the drawings may be exaggerated for clearer description.

Also, in this specification, a singular term may include a plural form unless otherwise indicated, and the same elements will be indicated by the same reference numerals.

Hereinafter, a cold water generator 100 and a thermoelectric cooling device 200 provided therein according to an embodiment of the present disclosure will be described with reference to FIGS. 1 to 8.

Figure 1:
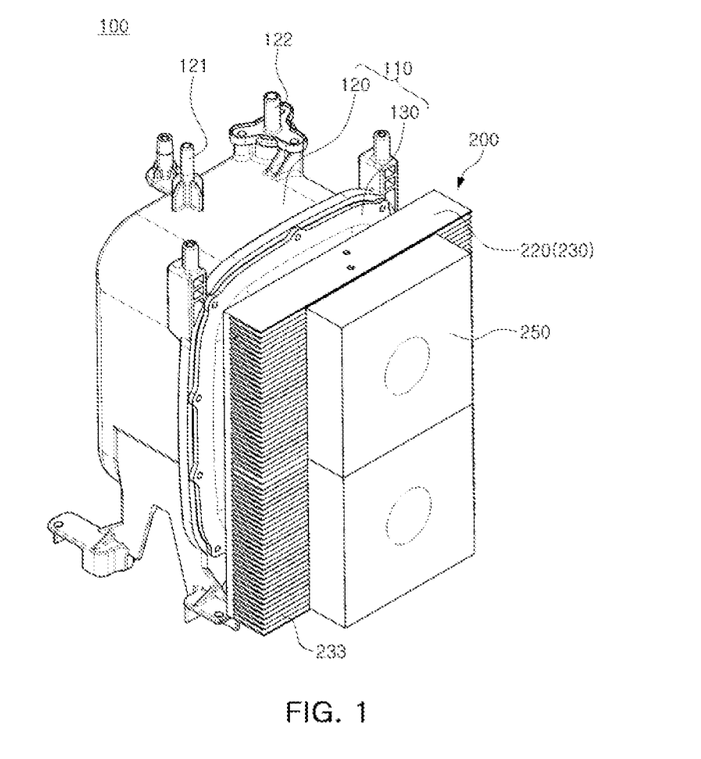
FIG. 1 is a perspective diagram illustrating a thermoelectric cooling device according to an embodiment of the present disclosure.
Figure 2:
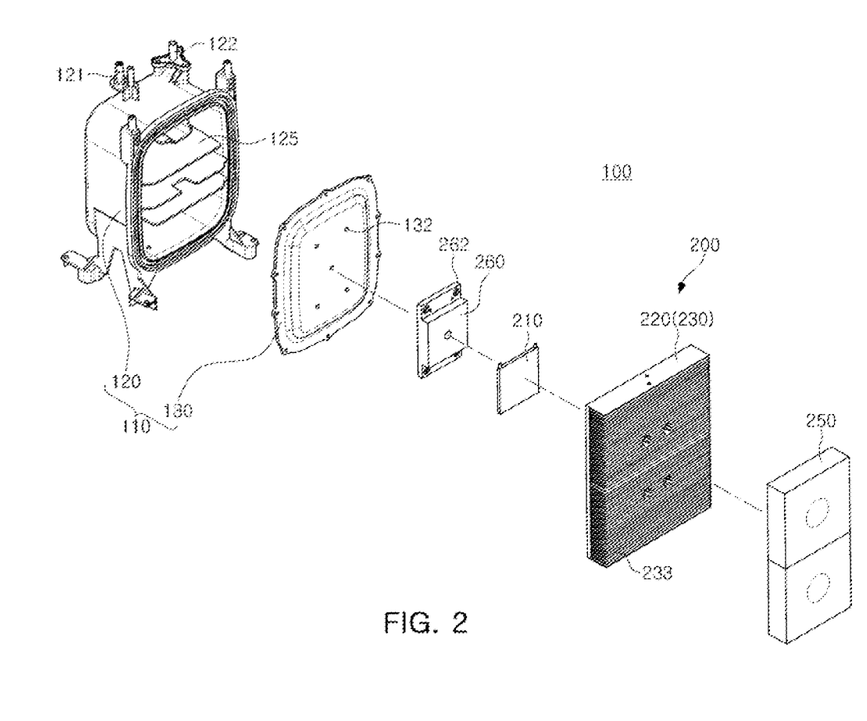
FIG. 2 is an exploded perspective diagram illustrating the thermoelectric cooling device illustrated in FIG. 1 and a cold water generator including the same.
Figure 3:
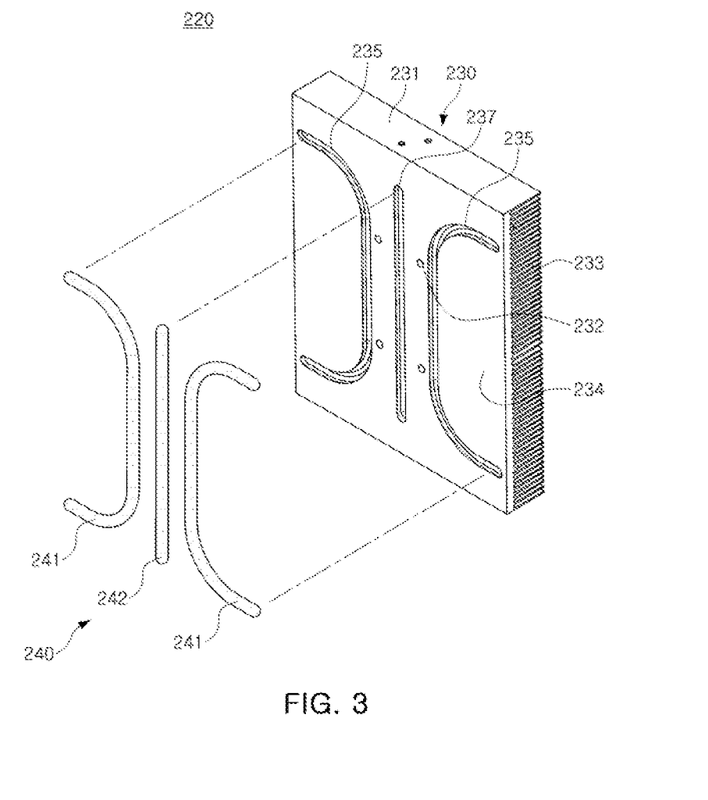
FIG. 3 is an exploded perspective diagram illustrating a heat pipe and a heat sink included in a heat sink assembly of the thermoelectric cooling device illustrated in FIG. 2.
Figure 4:
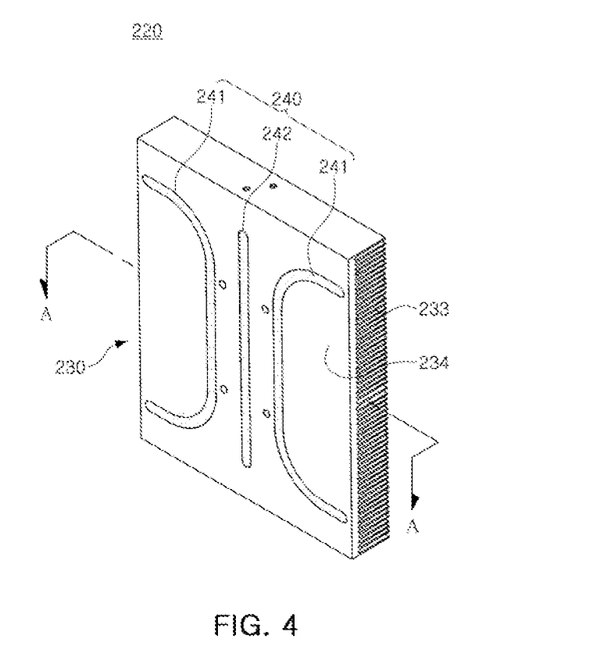
FIG. 4 is a perspective diagram illustrating a state in which the heat pipe illustrated in FIG. 3 is seated on and coupled to a mounting groove of the heat sink.
Figure 5:
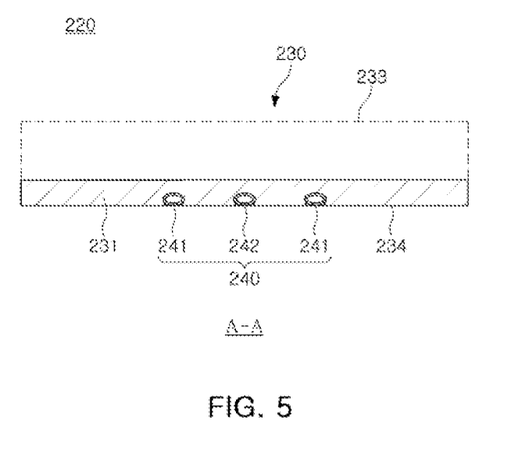
FIG. 5 is a cross-sectional diagram taken along line A-A' in FIG. 4.
Figure 6:
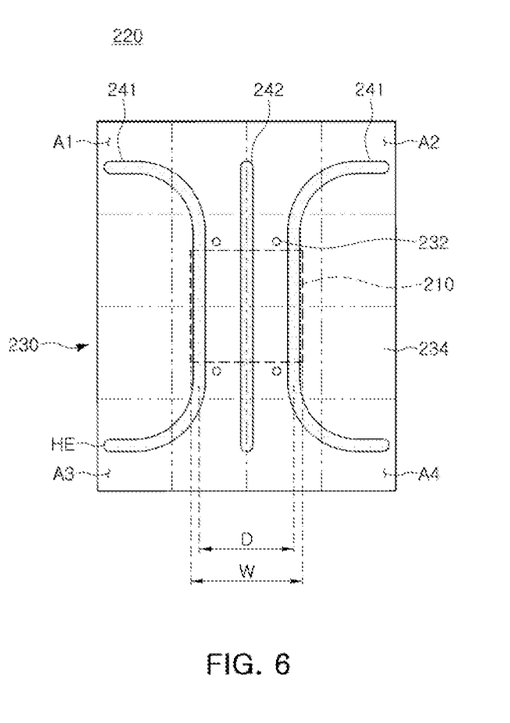
FIG. 6 is a diagram illustrating the heatsink assembly illustrated in FIG. 4, diagramed from the front.
Figure 7:
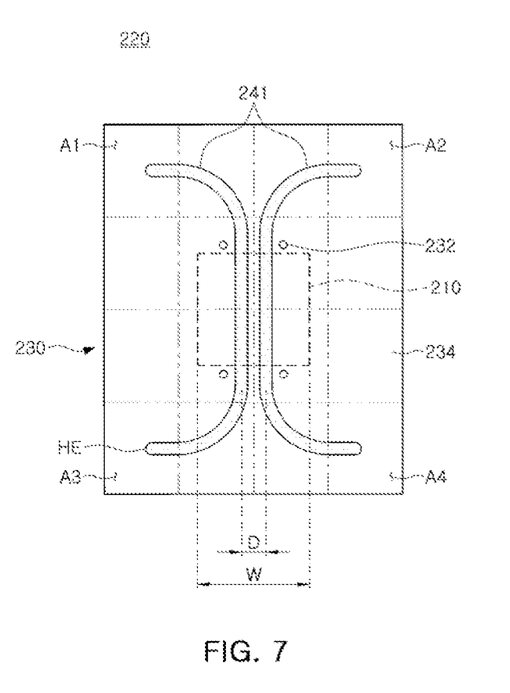
FIG. 7 is a diagram illustrating a modified example of a heatsink assembly included in a thermoelectric cooling device according to an embodiment of the present disclosure, diagramed from the front.
Figure 8:
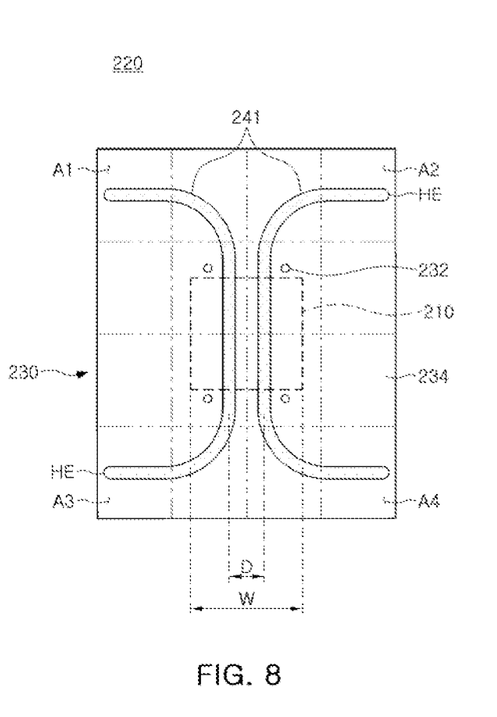
FIG. 8 is a diagram illustrating another modified example of a heatsink assembly included in a thermoelectric cooling device according to an embodiment of the present disclosure, diagramed from the front.

FIG. 1 is a perspective diagram of a cold water generator 100 according to an embodiment of the present disclosure, and FIG. 2 is an exploded diagram of the cold water generator 100 illustrated in FIG. 1 and a thermoelectric cooling device 200 provided therein. 3 is an exploded perspective diagram illustrating the heat pipe 240 and the heat sink 230 included in the heat sink assembly 220 of the thermoelectric cooling device 200 illustrated in FIG. 2, and FIG. 3 is a perspective diagram illustrating a state in which the heat pipe 240 is seated and coupled to the mounting grooves 235 and 237 of the heat sink 230, and FIG. 5 is a cross-sectional diagram taken along line A-A' in FIG. 6 is a front diagram of the heat sink assembly 220 illustrated in FIG. 4. FIGS. 7 and 8 are front diagrams illustrating a modified example of the heat sink assembly 220 provided in the thermoelectric cooling device 200 according to an embodiment of the present disclosure.

Referring to FIGS. 1 and 2, the cold water generating apparatus 100 according to an embodiment of the present disclosure may include a tank body 110 for accommodating water therein, and a thermoelectric cooling device 200 for cooling water accommodated in the tank body 110.

The tank body 110 may have a space for storing water therein, and water filtered through a filter unit (not illustrated) may be accommodated in the tank body 110.

The tank body 110 may have various shapes, but as an example, as illustrated in FIGS. 1 and 2, the tank body 110 may include a first body 120 and a second body 130 incorporated into the first body 120 and forming an inner space together with the first body 120.

In this case, the first body 120 may include an inlet 121 through which water flows in and an outlet 122 through which the cooled cold water is discharged, and cross-plate 125 for preventing rapid mixing of water flowing in through the inlet 121 and water contained in the tank body 110 may be provided therein.

Also, the first body 120 may have a relatively larger volume than that of the second body 130 and may be formed of a synthetic resin material. Also, the second body 130 may be formed of a metal material such as stainless steel to be connected to the cooling side of the thermoelectric module 210 to be described later and to absorb heat from second body 130 on the cooling side of the thermoelectric module 210. In this case, while the cold water is stored through the first body 120 formed of a synthetic resin material having a relatively large volume and the second body 130 formed of a metal material having a relatively small volume, heat transfer between the cold water and the outside air may be reduced to reduce the temperature of the cold water, and also, the water contained in the tank body 110 may be directly cooled through the second body 130 formed of a metal.

However, the configuration of the tank body 110 is not limited to the embodiments illustrated in FIGS. 1 and 2, and may have various structures and shapes as long as cold water may be generated through the thermoelectric cooling device 200. For example, the tank body 110 may have a known structure in which a heat conduction member thermally connected to the cooling side of the thermoelectric module 210 extends from the outside to the inside of the tank body 110, or may have a known structure in which the tank cover the upper part of the tank body.

In the description below, a thermoelectric cooling device 200 according to an embodiment of the present disclosure will be described with reference to FIGS. 2 to 8.

The thermoelectric cooling device 200 according to an embodiment of the present disclosure may include a thermoelectric module 210, a heat sink 230, a heat pipe 240, and a cooling fan 250. Among the components, the thermoelectric module 210, the heat sink 230, and the cooling fan 250 may have a configuration similar to that of the general thermoelectric cooling device 200.

The thermoelectric module (thermoelectric element) 210 may perform cooling by application of electricity, heat absorption and heat emission may simultaneously occur on both sides of the thermoelectric module 210 by the Peltier effect, and the cooling side of the thermoelectric module 210 may absorb heat of the object to be cooled, and may discharge heat through the heat generating side of the thermoelectric module 210.

The cooling side of the thermoelectric module 210 may be configured to be directly thermally connected to the second body 130 of the tank body 110 described above, but a cooling block 260 for heat conduction may be disposed between the cooling side of the thermoelectric module 210 and the object to be cooled, such that the second body 130 and the cooling side of the thermoelectric module 210 may be indirectly thermally connected to each other by the cooling block 260. In this case, to connect the cooling block 260 to the second body 130, the bolt/nut coupling may be performed through the fastening hole 262 of the cooling block 260 and the fastening hole 132 of the second body 130. Meanwhile, the structure in which the cooling side of the thermoelectric module 210 cools the water contained in the tank body 110 is not limited to the structures in FIGS. 1 and 2, and as described above, the structure may be varied to the structure in which a heat conducting member thermally connected to the cooling side of the thermoelectric module 210 extends from the outside to the inside of the tank body 110 may be used.

The heat sink 230 may include a body 231 having a contact surface 234 in contact with the heat generating side of the thermoelectric module 210 on one side, and a plurality of heat dissipation fins 233 formed on the other side of the body 231 to improve heat dissipation performance through expansion of the contact area with air. The contact surface 234 of the heat sink 230 may be formed as a flat surface so as to be in close contact with the heating side of the thermoelectric module 210. Also, the heat sink 230 may be configured to have a larger area than that of the thermoelectric module 210 for smooth heat dissipation.

The cooling fan 250 may form an air flow to the heat sink 230, and may be installed on the heat radiation fin 233 to supply air to the heat radiation fin 233 of the heat sink 230. Also, a plurality of cooling fans 250 may be installed on the heat dissipation fins 233 as illustrated in FIGS. 1 and 2 such that air may be blown over a large area of the heat sink 230.

The heat pipe 240 may be coupled to the mounting grooves 235 and 237 formed on the contact surface 234 of the heat sink 230 and may form the heat sink assembly 220. The heat pipe 240 may be formed of a material such as aluminum having excellent thermal conductivity and both ends thereof may have a closed tube shape. The heat pipe 240 may include an evaporation unit and a condensing unit and may transfer heat using latent heat of a working fluid accommodated therein. Since the heat pipe 240 is a known component, a detailed description thereof will not be provided.

The heat pipe 240 may include a plurality of corner-extension heat pipes 241 having a shape extending from the central part of the heat sink 230 in which the thermoelectric module 210 is installed to the corner areas A1, A2, A3, A4 of the heat sink 230. That is, the corner-extension heat pipe 241 may transfer heat from the central part of the heat sink 230 to the corner areas A1, A2, A3, and A4 such that the temperature of the central part of the heat sink 230 may be lowered and the temperature of the corner areas A1, A2, A3, and A4 may increase, and accordingly, a difference in temperatures between the central part of the heat sink 230 and the corner areas A1, A2, A3, and A4 may be reduced.

The heat sink 230 may be formed of a metal material having excellent thermal conductivity (e.g., aluminum, etc.), but in the prior art, the temperature of central part of the heat sink 230 in contact with the heat generating side of the thermoelectric module 210 may be extremely high and the temperature around the heat sink 230 may be relatively low, such that there may be a limitation in heat dissipation through the entire area of the heat sink 230. In the embodiment of the present disclosure, by allowing heat to be transferred to the corner areas A1, A2, A3, and A4, sufficient heat may be dissipated through the central part of the heat sink 230 and also through the corner areas A1, A2, A3, and A4.

Also, the corner-extension mounting groove 235 in which the corner-extension heat pipe 241 is installed may have a shape corresponding to the shape of the corner-extension heat pipe 241.

Each of the corner-extension heat pipe 241 may have a shape extending from one side of the central part to the corner areas A1, A2, A3, A4, but to transfer heat to the plurality of corner areas A1, A2, A3, and A4 through one of the corner-extension heat pipes 241, each of the corner-extension heat pipes 241 may be extended from both sides of the central part, respectively, and both end portions HE of the corner-extension heat pipe 241 may have a shape reaching the corner areas A1, A2, A3, and A4 of the heat sink 230. That is, the corner-extension heat pipe 241 may have a shape in which the ends HE may reach the two corner areas A1, A2, A3, and A4.

Also, the heat pipe 240 may include at least two corner-extension heat pipes 241 such that the ends HE of the corner-extension heat pipes 241 may be disposed in four corner areas A1, A2, A3, and A4 of the heat sink 230. In this case, the corner-extension heat pipe 241 may have a symmetrical shape with respect to the center of the heat sink 230.

Meanwhile, the heat sink 230 may have a quadrangular shape as illustrated in FIGS. 2 to 8, and the corner areas A1, A2, A3, and A4 of the heat sink 230 may be configured to correspond to the four areas on the periphery when the contact surface 234 of the heat sink 230 is divided into four horizontally and vertically on a plane as illustrated in FIGS. 6 to 8. Accordingly, the corner-extension heat pipe 241 may transfer heat from the central part of the heat sink 230 to a wide area corresponding to the periphery of the heat sink 230 such that heat may be efficiently dissipated over the entire area of the heat sink 230.

As illustrated in FIGS. 3 to 6, the heat pipe 240 may further include a central heat pipe 242 disposed between the two corner-extension heat pipes 241. In this case, the central heat pipe 242 may be installed to be seated in the central mounting groove 237. The central heat pipe 242 may extend between the two corner-extension heat pipes 241 from the central part of the heat sink 230 and may transfer heat to an area in which heat is not transferred through the corner-extension heat pipe 241. Accordingly, when the central heat pipe 242 is additionally installed in the heat sink 230 part between the two corner-extension heat pipes 241, as illustrated in FIGS. 7 and 8, heat dissipation effect of the heat sink 230 may further improve as compared to the example in which only two corner-extension heat pipes 241 are installed.

In this case, as illustrated in FIGS. 3 to 8, in the heat pipe 240, a central part corresponding to the central part of the heat sink 230 may be disposed in a direction perpendicular to a direction of gravity. In this case, gravity may act on the working fluid in the heat pipe 240 such that moving in the vertical direction may be easily performed, and accordingly, heat transfer efficiency may be increased as compared to the example in which the heat pipe 240 is installed in the horizontal direction.

Also, to efficiently transfer the heat generated from the heat generating side of the thermoelectric module 210 to the periphery of the heat sink 230, the width W of the thermoelectric module 210 may have a larger value than the center distance D between the two corner-extension heat pipes 241 as illustrated in FIGS. 6 to 8.

Meanwhile, as illustrated in FIGS. 7 and 8, the center distance D between the two corner-extension heat pipes 241 may be configured to be relatively small as illustrated in FIG. 7 within a range having a value smaller than the width W of the thermoelectric module 210 W, and as illustrated in FIG. 8, the distance may be relatively great as compared to FIG. 7. In this case, the position of the fastening hole 232 for fixing the heat sink 230 may be adjusted so as to not overlap the corner-extension heat pipe 241.

Referring to FIG. 3, the heat pipe 240 may be configured as a pipe having a circular cross-section having both ends closed, and when installed in the mounting grooves 235 and 237 in this state, the heat pipe 240 may protrude to the external side of the contact surface 234 of the sink 230. As such, when the heat pipe 240 protrudes, the heat generating side of the thermoelectric module 210 and the heat sink 230 may not be in contact with each other, such that heat transfer from the heat generating side of the thermoelectric module 210 to the heat sink 230 may not be performed. Accordingly, the heat pipe 240 may be formed by pressing with a press such that the part exposed to the outside of the heat sink 230 while being coupled to the mounting grooves 235 and 237 may have the same level as a level of the contact surface 234.

As such, according to an embodiment of the present disclosure, through a simplified operation of forming the mounting grooves 235 and 237 corresponding to the shape of the heat pipe 240 on the heat sink 230 through machining, and pressing the heat pipe 240 having a circular cross-section while being seated in the mounting grooves 235 and 237 of the heat sink 230, the cross-section of the heat pipe 240 may have a flat shape. Also, the heat pipe 240 and the heat sink 230 have a simple coupling structure, and the heat sink 230 and the heat pipe 240 may be integrated by a pressing force, such that the heat sink assembly 220 may be easily manufactured. Also, since the heat pipe 240 may be in direct contact with the heat generating side of the thermoelectric module 210, heat generated in the thermoelectric module 210 may be easily transferred to the periphery of the heat sink 230. Also, according to an embodiment of the present disclosure, heat dissipation efficiency of the heat sink 230 may greatly improve while maintaining the shape of the general heat sink 230.

In the description below, cooling performance of the cold water generator 100 and the thermoelectric cooling device 200 according to an embodiment of the present disclosure will be described with reference to FIGS. 9 and 10.

Figure 9:
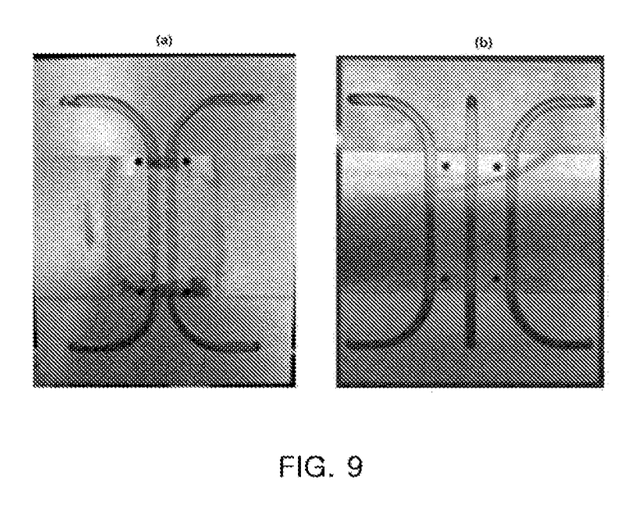
FIG. 9 is an actual image for testing a heat sink assembly according to an embodiment of the present disclosure, (a) is an actual image of the heat sink assembly illustrated in FIG. 7, and (b) is an actual image of the heat sink assembly illustrated in FIGS. 3 to 6.

FIG. 9 is an actual image for testing a heat sink assembly 220 according to an embodiment of the present invention, (a) is an actual image of the heat sink assembly 220 including a corner-extension heat pipe 241 illustrated in FIG. 7, and (b) is an actual image of the heat sink assembly in which two corner-extension heat pipes 241 are installed and a central heat pipe 242 is installed therebetween as illustrated in FIGS. 3 to 6. FIG. 10 is a graph of changes in temperature according to heat dissipation in a heat sink assembly 220 (a first embodiment) and a heat sink in which a heat pipe is not installed (a comparative example).

To compare the heat dissipation performances of the example in which the heat pipe 240 is not installed in the heat sink 230 (the comparative example) and the example in which the heat pipe 240 is installed in the heat sink 230 (the first embodiment), a test was performed using the cold water generator 100 (a purifier), which is a mass-produced product of the present applicant under the same conditions for the rest of the configurations. In the first embodiment, as illustrated in FIG. 9(a), a heat sink assembly 220 having two corner-extension heat pipes 241 in the heat sink 230 was used.

For both embodiments, the same amount of water at 30° C. was put into the tank body 110 under conditions of an external temperature of 35° C. and a relative humidity of 65%, and the thermoelectric module 210 was operated to measure changes of temperature for each area of the heat sink 230.

Figure 10:
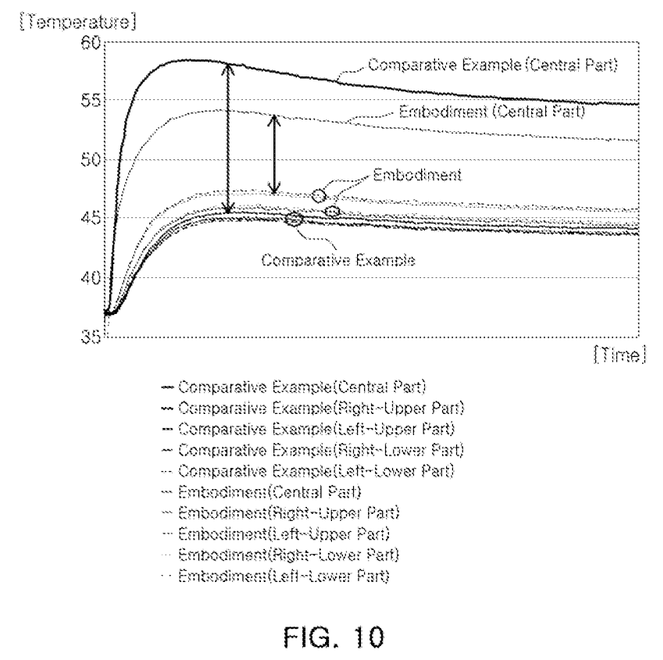
FIG. 10 is a graph of changes in temperature according to heat dissipation in a heat sink assembly (a first embodiment) and a heat sink in which a heat pipe is not installed (a comparative example).

Referring to FIG. 10, in the comparative example in which the heat pipe 240 is not installed, the maximum temperature of the central part of the heat sink 230 was 57.9° C., but in the first embodiment in which the heat pipe 240 is installed, as compared with the comparative example in which the heat pipe 240 is not installed, the maximum temperature of the central part of the heat sink 230 was reduced to 54.0° C. by approximately 4° C.

Meanwhile, in the comparative example in which the heat pipe 240 is not installed, the maximum temperature of the upper left, upper right, lower left, and lower right corner areas A1, A2, A3, and A4 of the heat sink 230 was 45.4° C., 44.8° C., 44.9° C., 45.0° C., respectively, whereas in the first embodiment in which the heat pipe 240 is installed, the maximum temperature rose to 47.1° C., 47.0° C., 45.7° C., and 45.7° C., respectively. That is, in the first embodiment in which the heat pipe 240 is installed, as compared with the comparative example in which the heat pipe 240 is not installed, the temperature on the upper side of the heat sink 230 was increased by about 2° C., and the temperature on the lower side was increased by about 1° C.

As such, in the first embodiment in which the heat pipe 240 is installed, the temperature of the central part of the heat sink 230 in which the thermoelectric module 210 is installed was lowered, and the temperature of the corner areas A1, A2, A3, and A4 was increased, and accordingly, it was confirmed that an efficient heat dissipation effect was able to be implemented throughout the entire area of the heat sink 230.

A test was performed on cold water extraction performance with respect to the comparative example in which the heat pipe 240 is not installed, the first embodiment in which the heat sink assembly 220 in which two corner-extension heat pipes 241 were installed on the heat sink 230 was used as illustrated in FIG. 9(a), and the second embodiment in which the heat sink assembly 220 in which two corner-extension heat pipes 241 and one central heat pipe 242 were installed on the heat sink 230 was used as illustrated in FIG. 20 FIG. 9(b).

To observe cooling performance of the cold water generator 100 in an extremely hot area using the cold water generator 100 (water purifier), which is the mass-produced product of the present applicant, under the same conditions other than the heat pipe 240, the same amount of water at 35° C. was put into the tank body 110 under the condition of an outdoor temperature of 40° C., which is an extreme condition than the test in FIG. 10, and cooling was performed. As a result of measuring the "first cooling cycle operating time (completion time)," which is the time when the thermoelectric module 210 was additionally operated for 30 minutes after reaching the cold water temperature of 6.5° C., in the first embodiment, the first cooling cycle was completed after 220 minutes, and in the second embodiment, the first cooling cycle was completed after 173 minutes, which was earlier than the first embodiment, but in the comparative example in which the heat pipe 240 was not installed, the heat dissipation of the heat sink 230 was not sufficient such that the cold water temperature did not reach 6.5° C. until 220 minutes elapsed, which is the completion time of the first cooling cycle of the example.

Also, when 120 ml of cold water was continuously extracted with respect to comparative embodiments, embodiments 1 and 2, the number of cups capable of extracting cold water of 10° C. or less and the temperature of each cup were measured, and the results in the table were obtained. In this case, as for the comparative example and the first embodiment, 120 ml of cold water was continuously extracted at the time point after 220 minutes elapsed when the first cooling cycle of the first embodiment was completed and at the time point after 173 minutes elapsed when the first cooling cycle of the second embodiment was completed.

As indicated in the comparison table below, it was confirmed that, in the comparative example in which the heat pipe 240 is not installed, the number of cups of extracting 10° C. or less cold water was 5 cups, which is smaller than the 6 cups in embodiments 1 and 2, and the average temperature was high (for reference, the cold water temperature of the first cup had a higher value than that of the second cup due to the water remaining in the cold water extraction path).

Also, in the second embodiment, it was confirmed that the first cycle operating time was earlier than that of the first embodiment, and accordingly, heat dissipation performance of the heat sink 230 was better than that of the first embodiment. Also, in the embodiment 1 and embodiment 2, the number of cups of extracting 10° C. or less cold water was the same as 6 cups, and the average temperature of 10° C. or less cold water was also similar, and accordingly, it was confirmed that cooling performance during continuous extraction was also similar.

TABLE 1

[Comparison table of heat dissipation performance and cooling performance]

| Classification | Comparative example 1 | First embodiment | Second embodiment |
| --- | --- | --- | --- |
| First cycle operation time | — (Not reached 6.5° C.) | 220 minutes | 173 minutes |
| Cold water temperature of each glass when extracting 120 ml (° C.) | 8.2, 6.8, 7.0, 7.8, 9.3, 11.7 | 7.3, 5.5, 5.4, 6.0, 7.0, 9.2, 11.8 | 7.8, 5.9, 5.9, 6.4, 7.1, 9.6, 12.2 |
| Average temperature of cold water below 10° C. (° C.) | 7.8° C. | 6.7° C. | 7.1° C. |
| Number of cups of cold water below 10° C. | 5 cups | 6 cups | 6 cups |
| First cup temperature (° C.) | 8.2° C. | 7.3° C. | 7.8° C. |
| Minimum temperature of cold water (° C.) | 6.8° C. | 5.4° C. | 5.9° C. |

While the embodiments have been illustrated and described above, it will be apparent to those skilled in the art that modifications and variations could be made without departing from the scope of the present disclosure as defined by the appended claims.

The invention claimed is:
1. A cold water generator, comprising:
a thermoelectric cooling device; and
a tank body having a space for accommodating water therein, and cooling the water accommodated therein by a cooling side of a thermoelectric module, the thermoelectric cooling device comprising:
the thermoelectric module performing cooling by applying electricity;
a heat sink having a body having a contact surface in contact with a heat generating side on one side, and a plurality of heat dissipation fins formed on the other side of the body, and emitting heat transferred from the heat generating side of the thermoelectric module;
a heat pipe coupled to a mounting groove formed on the contact surface of the heat sink and performing heat transfer through a working fluid accommodated therein; and
a cooling fan forming an air flow to the heat sink,
wherein the heat pipe includes two corner-extension heat pipes having a shape extending from a central part of the heat sink in which the thermoelectric module is installed to a corner area of the heat sink,
wherein the mounting groove has a shape corresponding to a shape of the corner-extension heat pipe,
wherein in the heat pipe, a part exposed externally of the heat sink while being coupled to the mounting groove has the same level as a level of the contact surface,
wherein each of the two corner-extension heat pipes extends from both sides of the central part such that respective ends of each of the corner-extension heat pipes reaches two corner areas of the heat sink, wherein one of the two corner-extension heat pipes has both ends respectively positioned at the two corner areas, and the other corner-extension heat pipe has both ends respectively positioned at the other two corner areas, and wherein the heat pipe further includes a central heat pipe disposed between the two corner-extension heat pipes.

2. The cold water generator of claim 1, wherein the heat sink is formed in a quadrangular shape, and wherein the corner area corresponds to four outermost areas when the contact surface of the heat sink is divided horizontally and vertically into four equal parts on a plane.

3. The cold water generator of claim 1, wherein a width of the thermoelectric module has a value greater than a central distance between the two corner-extension heat pipes.

4. The cold water generator of claim 1, wherein the tank body includes a first body formed of synthetic resin and a second body formed of metal, and wherein the cooling side of the thermoelectric module is configured to absorb heat from the second body.

* * * * *